(12) United States Patent
Iorga et al.

(10) Patent No.: US 11,115,506 B2
(45) Date of Patent: Sep. 7, 2021

(54) INNER VXLAN TUNNEL PACKET DETECTION

(71) Applicant: LENOVO Enterprise Solutions (Singapore) PTE. LTD., New Tech Park (SG)

(72) Inventors: Radu Iorga, Bucharest (RO); Corneliu-Ilie Calciu, Bucharest (RO)

(73) Assignee: LENOVO Enterprise Solutions (Singapore) PTE. LTD, New Tech Park (SG)

(*) Notice: Subject to any disclaimer, the term of this patent is extended or adjusted under 35 U.S.C. 154(b) by 70 days.

(21) Appl. No.: 16/591,448

(22) Filed: Oct. 2, 2019

(65) Prior Publication Data

US 2021/0105345 A1 Apr. 8, 2021

(51) Int. Cl.
*H04L 29/06* (2006.01)
*H04L 12/46* (2006.01)

(52) U.S. Cl.
CPC .......... *H04L 69/22* (2013.01); *H04L 12/4633* (2013.01); *H04L 12/4641* (2013.01); *H04L 69/16* (2013.01)

(58) Field of Classification Search
CPC . H04L 69/22; H04L 12/4633; H04L 12/4641; H04L 69/16
See application file for complete search history.

(56) References Cited

U.S. PATENT DOCUMENTS

| 2017/0317919 A1* | 11/2017 | Fernando | H04L 41/0806 |
| 2018/0212818 A1* | 7/2018 | Ide | H04L 43/0823 |
| 2021/0014166 A1* | 1/2021 | Gao | H04L 47/34 |

OTHER PUBLICATIONS

Mahalingam et al., IVirtual eXtensible Local Area Network (VXLAN): A Framework for Overlaying Virtualized Layer 2 Networks over Layer 3 Networks, ETF RFC 7348, Aug. 2014 (Year: 2014).*
Cisco, VXLAN Overview: Cisco Nexus 9000 Series Switches, Document ID: 1476825831111564, Updated: Nov. 6, 2013, Published Apr. 19, 2019. (Year: 2019).*
Cisco, "VXLAN Overview: Cisco Nexus 9000 Series Switches", Dated Nov. 6, 2013, pp. 1-8.
"VXLAN Overview: Cisco Nexus 9000 Series Switches," Jan. 2015, https://www.cisco.com/c/en/us/products/collateral/switches/nexus-9000-series-switches/white-paper-c11-729383.html (last visited May 11, 2021).

* cited by examiner

*Primary Examiner* — Shailendra Kumar
(74) *Attorney, Agent, or Firm* — Kunzler Bean & Adamson; Bruce R. Needham (57) ABSTRACT

An apparatus for writing an L2 frame type in a VXLAN header includes a VXLAN stripper configured to strip encapsulation headers in layers above a VXLAN packet encapsulating a L2 frame of a data packet in response to receiving the data packet over a VXLAN. The apparatus includes a L2 frame type reader configured to read a L2 frame type stored in the VXLAN header in response to stripping the encapsulation headers, and a VXLAN re-encapsulator configured to re-encapsulate the VXLAN packet in a same format as the layers and associated encapsulation headers stripped from the received data packet in response to the L2 frame type indicating the L2 frame comprises data for transmission.

18 Claims, 7 Drawing Sheets

FIG. 8 though for this application, is intended to encompass, without limitation, a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), a memory stick, a floppy disk, a mechanically encoded device such as punch-cards or raised structures in a groove having instructions recorded thereon, and any suitable combination of the foregoing, but would not include propagating signals. In the context of this document, a computer readable storage medium may be any tangible medium that can contain, or store a program for use by or in connection with an instruction execution system, apparatus, or device.

INNER VXLAN TUNNEL PACKET DETECTION

FIELD

The subject matter disclosed herein relates to virtual extensible local area network ("VXLAN") and more particularly relates to writing a Layer 2 ("L2") frame type in a VXLAN header.

BACKGROUND

When a VXLAN packet is received by a router, knowing the L2 frame type is important to determine if the L2 frame is data to be forwarded or is a command packet with a command encoded in the L2 frame. A data packet encapsulating a VXLAN packet includes an extra header not typically encountered. Typical routers are capable of de-encapsulation (e.g. stripping off headers from the L2 frame) of a non-VXLAN data packet to reach an L2 frame to discover the L2 frame type. However, the extra VXLAN header presents problems in that a typical device that de-encapsulates data packets would strip headers above the VXLAN packet leaving the VXLAN packet intact.

Currently, to discover the L2 frame type of a data packet with VXLAN encapsulation, two methods are used. A first method uses ternary content-addressable memory ("TCAM") that allows searching of entire contents in a single clock cycle. For a data packet with VXLAN encapsulation, the TCAM would need to be wider than for non-VXLAN encapsulation, which increases cost, size, power consumption, etc. A second method uses current router engines with additional processing steps. In a first step, the router removes headers above the VXLAN packet and a second step removes the VXLAN header to get to the L2 packet, which increases latency and power consumption.

BRIEF SUMMARY

An apparatus for writing an L2 frame type in a VXLAN header is disclosed. A method performs the functions of the apparatus. The apparatus includes a VXLAN stripper configured to strip encapsulation headers in layers above a VXLAN packet encapsulating a L2 frame of a data packet in response to receiving the data packet over a VXLAN. The apparatus includes a L2 frame type reader configured to read a L2 frame type stored in a VXLAN header of the VXLAN packet in response to stripping the encapsulation headers, and a VXLAN re-encapsulator configured to re-encapsulate the VXLAN packet in a same format as the layers and associated encapsulation headers stripped from the received data packet in response to the L2 frame type indicating the L2 frame comprises data for transmission.

A method for writing an L2 frame type in a VXLAN header includes stripping encapsulation headers in layers above a VXLAN packet encapsulating a L2 frame of a data packet in response to receiving the data packet over a VXLAN, reading a L2 frame type stored in a VXLAN header in the VXLAN packet in response to stripping the encapsulation headers, and re-encapsulating the VXLAN packet in a same format as the layers and associated encapsulation headers stripped from the received data packet in response to the L2 frame type indicating the L2 frame includes data for transmission.

An apparatus for writing a L2 frame type in a VXLAN header includes a L2 frame type reader configured to determine a type of a L2 frame prior to encapsulation of the L2 frame in a VXLAN packet, a VXLAN encapsulator configured to encapsulate the L2 frame into a VXLAN packet where the VXLAN packet includes a VXLAN header and the L2 frame. The apparatus includes a L2 frame type header writer configured to write the determined L2 frame type in the VXLAN header of the VXLAN packet, a data packet encapsulator configured to encapsulate the VXLAN packet with additional layers to form a data packet suitable for transmission, and a transmitter configured to transmit the data packet in response to the data packet encapsulator forming the data packet.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system or method. Accordingly, embodiments may take the form of an entirely hardware embodiment or an embodiment combining software (including firmware, resident software, micro-code, etc.) and hardware aspects that may all generally be referred to herein as a "circuit," "stripper," "reader," "encapsulator," "writer," "system," etc. Furthermore, portions of embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a hard disk, a random access memory (RAM), a read-only memory (ROM), an erasable programmable read-only memory (EPROM or Flash memory), a magnetic storage device, and the like or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, user selections, network transactions, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that some of the blocks of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. The blocks of the schematic flowchart diagrams are not meant to be exclusive and other steps and methods may also be executed between or concurrently with blocks of the schematic flowchart diagrams.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for writing an L2 frame type in a VXLAN header is disclosed. A method performs the functions of the apparatus. The apparatus includes a VXLAN stripper configured to strip encapsulation headers in layers above a VXLAN packet encapsulating a L2 frame of a data packet in response to receiving the data packet over a VXLAN. The apparatus includes a L2 frame type reader configured to read a L2 frame type stored in a VXLAN header of the VXLAN packet in response to stripping the encapsulation headers, and a VXLAN re-encapsulator configured to re-encapsulate the VXLAN packet in a same format as the layers and associated encapsulation headers stripped from the received data packet in response to the L2 frame type indicating the L2 frame comprises data for transmission.

In some embodiments, the apparatus includes a command circuit configured to strip the VXLAN header from the VXLAN packet in response to the L2 frame type including a command protocol and to execute a command encoded in the L2 frame. In other embodiments, the data packet is encapsulated using media access control address-in-user datagram protocol ("MAC-in-UDP") encapsulation. In other embodiments, the data packet includes a VXLAN packet with the VXLAN header and encapsulating the L2 frame, a user datagram protocol ("UDP") packet with a UDP header and encapsulating the VXLAN packet, an outer Internet Protocol ("IP") packet with an outer IP header and encapsulating the UPD packet, and the data packet includes an outer media access control ("MAC") header and the data packet encapsulates the outer IP packet.

In some embodiments, the L2 frame type reader reads the L2 frame type while the VXLAN packet is intact. In other embodiments, the VXLAN header includes the L2 frame type stored in the VXLAN header in addition to a VXLAN identifier ("VNID") and a VXLAN flag field. In other embodiments, the L2 frame type is stored in the VXLAN header at a VXLAN tunnel end point ("VTEP") that encapsulates the L2 frame into the data packet and transmits the data packet. In other embodiments, the VTEP includes a L2 frame type reader configured to determine the type of the L2 frame prior to encapsulation of the L2 frame in the VXLAN packet and a VXLAN header writer configured to write the determined L2 frame type in the VXLAN header of the VXLAN packet. In other embodiments, the L2 frame type includes a command protocol or a data protocol.

A method for writing an L2 frame type in a VXLAN header includes stripping encapsulation headers in layers above a VXLAN packet encapsulating a L2 frame of a data packet in response to receiving the data packet over a VXLAN, reading a L2 frame type stored in a VXLAN header the VXLAN packet in response to stripping the encapsulation headers, and re-encapsulating the VXLAN packet in a same format as the layers and associated encapsulation headers stripped from the received data packet in response to the L2 frame type indicating the L2 frame includes data for transmission.

In some embodiments, the method includes stripping the VXLAN header from the VXLAN packet in response to the L2 frame type including a command protocol and executing a command encoded in the L2 frame. In other embodiments, reading a L2 frame type includes reading the L2 frame type while the VXLAN packet is intact. In other embodiments, the data packet includes a VXLAN packet with the VXLAN header and encapsulating the L2 frame, a UDP packet with a UDP header and encapsulating the VXLAN packet, an outer IP packet comprising an outer IP header and encapsulating the UPD packet, and the data packet includes an outer MAC header and the data packet encapsulates the outer IP packet.

In some embodiments, the VXLAN header includes the L2 frame type stored in the VXLAN header in addition to a VNID and a VXLAN flag field. In other embodiments, the L2 frame type is stored in the VXLAN header at a VTEP that encapsulates the L2 frame into the data packet and transmits the data packet. In other embodiments, the L2 frame type includes a command protocol and/or a data protocol. In other embodiments, the data packet is encapsulated using MAC-in-UDP encapsulation.

An apparatus for writing a L2 frame type in a VXLAN header includes a L2 frame type reader configured to determine a type of a L2 frame prior to encapsulation of the L2 frame in a VXLAN packet, a VXLAN encapsulator configured to encapsulate the L2 frame into a VXLAN packet where the VXLAN packet includes a VXLAN header and the L2 frame. The apparatus includes a L2 frame type header writer configured to write the determined L2 frame type in the VXLAN header of the VXLAN packet, a data packet encapsulator configured to encapsulate the VXLAN packet with additional layers to form a data packet suitable for transmission, and a transmitter configured to transmit the data packet in response to the data packet encapsulator forming the data packet.

In some embodiments, the apparatus includes a VXLAN stripper configured to strip encapsulation headers in the layers above the VXLAN packet in response to receiving the data packet over a VXLAN and a L2 frame type reader configured to read a L2 frame type stored in the VXLAN header in response to stripping the encapsulation headers. In the embodiments, the apparatus includes a command circuit configured to strip the VXLAN header from the VXLAN packet in response to the L2 frame type including a command protocol and execute a command encoded in the L2 frame. In the embodiment, the apparatus includes a VXLAN re-encapsulator configured to re-encapsulate the VXLAN packet in a same format as the layers and associated encapsulation headers stripped from the received data packet in response to the L2 frame type indicating the L2 frame includes data for transmission. In other embodiments, the data packet is encapsulated using MAC-in-UDP encapsulation and wherein the VXLAN header comprises the L2 frame type stored in the VXLAN header in addition to a VNID and a VXLAN flag field.

Figure 1:
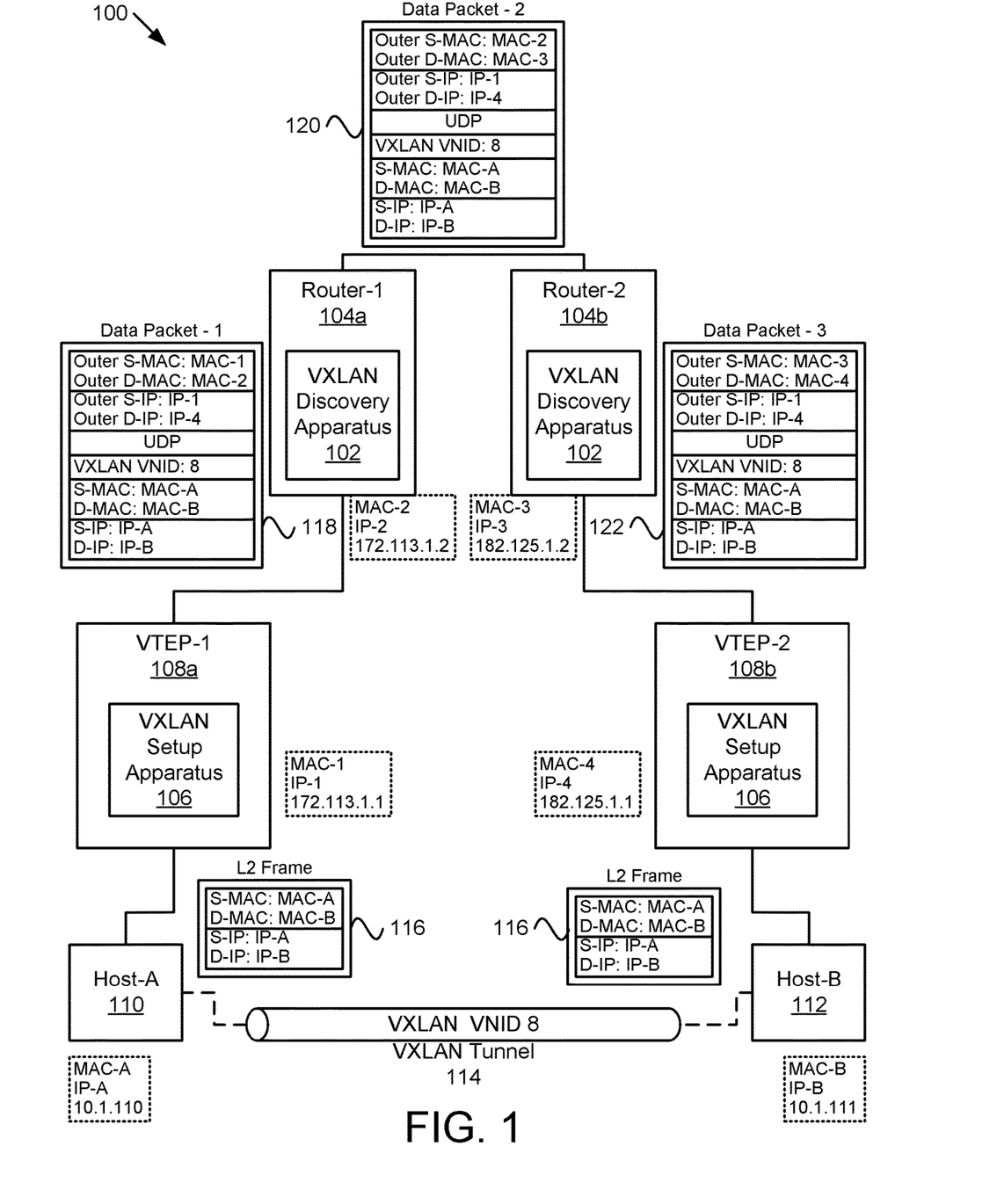
FIG. 1 is a schematic block diagram illustrating one embodiment of a system for VXLAN transmission of data packets with a VXLAN discovery apparatus and a VXLAN setup apparatus.

FIG. 1 is a schematic block diagram illustrating one embodiment of a system 100 for VXLAN transmission of data packets with a VXLAN discovery apparatus 102 and a VXLAN setup apparatus 106. The system 100 includes a VXLAN discovery apparatus 102 in a first router 104a and in a second router 104b, a VXLAN setup apparatus 106 in a first VXLAN tunneling endpoint ("VTEP") 108a and a second VTEP 108b, a Host-A 110, a Host-B 112, a VXLAN tunnel 114, an L2 frame 116, a first data packet 118, a second data packet 120, and a third data packet 122, which are described below.

When Host-A 110 wants to send data to a Host-B 112 over a VXLAN tunnel 114, Host-A 110 breaks data up into Layer 2 ("L2") frames. Layer 2 is defined by the Open Systems Interconnection ("OSI") model where Layer 2 is a data link layer, which provides node-to-node data transfer between two directly connected nodes. Data may be sent using an underlying Ethernet frame, which is a data link layer protocol data unit so that within a Layer 2 system, a data unit on an Ethernet link transports an Ethernet frame as its payload.

A virtual LAN ("VLAN") allows a LAN to be broken up into virtual LANs where each VLAN has security so that data of a VLAN will not go to nodes outside the VLAN. Where a host needs to send data outside the LAN, typically the data goes through a router or other Layer 3 device. A Layer 3 device is an OSI model defined as a networking layer. The network layer provides the functional and procedural means to transfer variable length data packets from one node to another node in a different network. Data packets are transferred over Layer 3 using addresses of the nodes. While VLAN has some capability of sending data across networks, the capability is limited and the number of VLAN addresses are limited to 4096.

VXLAN offers 16 million VXLAN identifiers, which enables VXLAN use in complex cloud applications. Hosts are connected to VXLAN tunnel endpoints ("VTEPs") that encapsulate L2 frames in format appropriate for VXLAN tunneling. VXLAN uses VTEP devices to map tenant's end devices to VXLAN segments and to perform VXLAN encapsulation and de-encapsulation. Each VTEP has a switch interface on the local LAN segment to support local endpoint communication through bridging and an IP interface to the IP transport network. The IP interface uses a unique IP address that identifies the VTEP device on the transport IP network, which is known as the infrastructure VLAN. The VTEP device uses this IP address to encapsulate L2 frames and to transmit the encapsulated data packets to the transport network through the IP interface. VTEPs typically have the capability to discover other VTEPs and learn media access control ("MAC") address-to-VTEP mappings through its IP interface.

VXLAN segments are independent of underlying networks topologies and underlying IP network between VTEPs are independent of the VXLAN overlay. The underlying IP network routes encapsulated packets based on the outer IP address header, which has the initiating VTEP as the source IP address and the terminating VTEP as the destination IP address.

VXLAN is a Layer 2 overlay scheme over a Layer 3 network. VXLAN, in some embodiments, uses a media access control address-to-User Datagram Protocol ("MAC-in-UDP") encapsulation. In MAC-in-UDP encapsulation, the original L2 frame 116 has a VXLAN header added where the L2 frame 116 is the payload of a VXLAN packet. The VXLAN packet is the payload of a User Datagram Protocol ("UDP") packet that includes a UDP header. The UDP packet becomes the payload for an outer IP packet with an outer IP header. The IP packet becomes the payload for a data packet with an outer MAC header.

When a VXLAN packet is received by a router (e.g. router-1 104a), knowing the L2 frame type is important to determine if the L2 frame 116 is data to be forwarded or is a command packet with a command encoded in the L2 frame 116. A data packet encapsulating a VXLAN packet includes an extra header not typically encountered. Typical routers are capable of de-encapsulation (e.g. stripping off headers from the L2 frame 116) of a non-VXLAN data packet to reach an L2 frame 116 to discover the L2 frame type. However, the extra VXLAN header presents problems in that a typical device that de-encapsulates data packets would strip headers above the VXLAN packet leaving the VXLAN packet intact.

Currently, to discover the L2 frame type of a data packet with VXLAN encapsulation, two methods are used. A first method uses ternary content-addressable memory ("TCAM") that allows searching of entire contents in a single clock cycle. For a data packet with VXLAN encapsulation, the TCAM would need to be wider than for non-VXLAN encapsulation, which increases cost, size, power consumption, etc. A second method uses current router engines with additional processing steps. In a first step, the router removes headers above the VXLAN packet and a second step removes the VXLAN header to get to the L2 packet, which increases latency and power consumption.

Embodiments described herein improve over current technology by allowing discovery of the L2 frame type without de-encapsulating the VXLAN packet. In some embodiments, the VXLAN discovery apparatus 102 strips encapsulation headers above a VXLAN packet encapsulating a Layer 2 ("L2") frame of a data packet in response to receiving the data packet and reads a L2 frame type stored in the VXLAN header in response to stripping the encapsulation headers. The VXLAN discovery apparatus 102 is discussed in more detail below.

In some embodiments, the VXLAN setup apparatus 106 determines a type of a L2 frame 116 prior to encapsulation in a VXLAN packet that includes a VXLAN header. The VXLAN setup apparatus 106 writes the L2 frame type in the VXLAN header and then encapsulates the VXLAN packet with additional layers and headers to form a data packet suitable for transmission. The VXLAN setup apparatus 106 is described in more detail below.

When Host-A 110 wants to send data to Host-B 112 over a VXLAN tunnel 114, Host-A 110 breaks up the data and forms L2 frames 116 that include the data. As depicted, the L2 frame 116 includes a source IP address of IP-A, a destination IP address of IP-B, a source MAC address of MAC-A and a destination MAC address of MAC-B. Host-A 110 has a local IP address of 10.1.110, an IP address of IP-A and a MAC address of MAC-A and the first VTEP 108a has a local IP address of 172.113.1.1, an IP address of IP-1, and a MAC address of MAC-1.

The VXLAN setup apparatus 106 encapsulates the L2 frame 116 to create a first data packet 118 ready to be transported to the first router 104a. The VXLAN header includes the L2 frame type. The first data packet 118 includes the IP address and MAC address information of the L2 packet along with a VXLAN identifier ("VNID") of "8." The first data packet 118 includes a UDP header, an outer IP header and an outer MAC header. The outer IP header includes a source outer IP address of IP-1 (e.g. VTEP-1 108a), a destination IP address of IP-4 (e.g. VTEP-2 108b), an outer source MAC address of MAC-1 and an outer destination MAC address of MAC-2, which is the IP address of the first router 104a.

The first VTEP 108a transmits the first data packet 118 to the first router 104a and the VXLAN discovery apparatus 102 strips the outer MAC header, the outer IP header and the UDP header leaving the VXLAN packet. The VXLAN discovery apparatus 102 reads the L2 frame type from the VXLAN header of the first data packet 118 while the VXLAN packet is intact, which means that the VXLAN header is not stripped from the VXLAN packet. The VXLAN discovery apparatus 102, in the example depicted in FIG. 1, re-encapsulates the VXLAN packet in a same format as the layers and associated encapsulation headers stripped from the received first data packet 118 with minor changes to the information in the headers, as depicted in the second data packet 120. Note that the L2 frame header, the VXLAN header, the UDP header, and the outer IP header are the same while the outer MAC header is modified to include a source outer MAC address of MAC-2 and a destination outer MAC address of MAC-3, which is sufficient to transmit the second data packet 120 to the second router 104b.

The VXLAN discovery apparatus 102 of the second router 104b processes the second data packet 120 the same way as that the VXLAN discovery apparatus 102 of the first router 104a processes the first data packet 118 to create a third data packet 122, except that the outer MAC header of the third data packet 122 includes an outer source MAC address of MAC-3 (e.g. router-2 104b) and an outer destination MAC address of MAC-4 (e.g. VTEP-2 108b), which enables the second router 104b to send the third data packet 122 to the second VTEP 108b. The second VTEP 108b then strips all headers from the L2 frame 116 and transmits the original L2 frame 116 to Host-B 112. The second VTEP 108b also includes a VXLAN setup apparatus 106 so that Host-B 112 is able to transmit L2 frames to Host-A 110.

Figure 2:
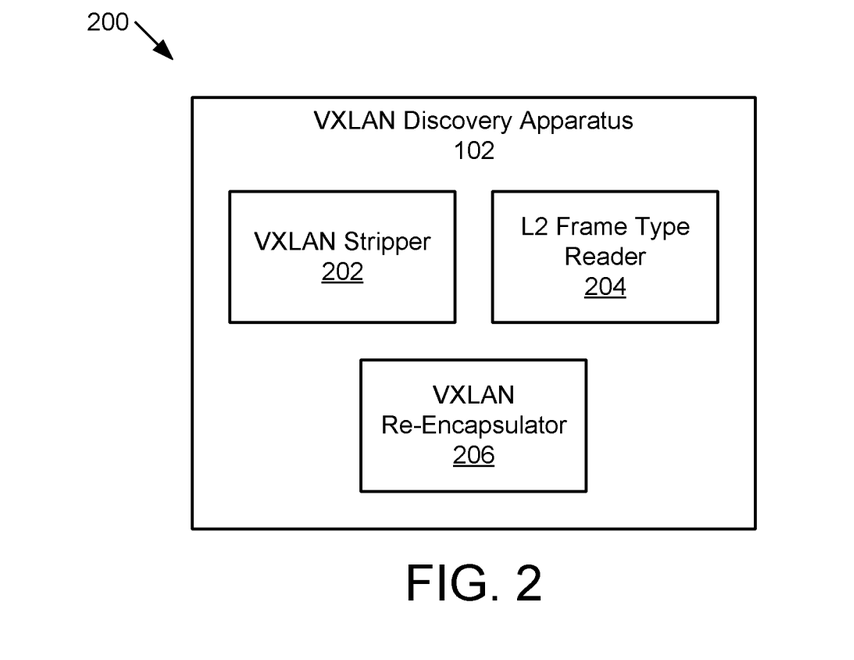
FIG. 2 is a schematic block diagram illustrating one embodiment of a VXLAN discovery apparatus.

FIG. 2 is a schematic block diagram illustrating one embodiment 200 of a VXLAN discovery apparatus 102. The VXLAN discovery apparatus 102 includes a VXLAN stripper 202, a L2 frame type reader 204 and a VXLAN re-encapsulator 206, which are described below. In some embodiments, the VXLAN discovery apparatus 102 is embodied with hardware circuits, for example, in a router, a high-speed switch or other Layer 3 device. The hardware circuits may include transistors, registers, memory, logic gates, and the like and may be implemented using an application specific integrated circuit ("ASIC"). In other embodiments, a portion of the VXLAN discovery apparatus 102 may be implemented with code stored on computer readable storage media and executed by a processing apparatus capable of executing the code. One of skill in the art will recognize other ways of implementing the VXLAN discovery apparatus 102.

In some embodiments, the VXLAN discovery apparatus 102 includes a VXLAN stripper 202 configured to strip encapsulation headers in layers above a VXLAN packet encapsulating a L2 frame 116 of a data packet in response to receiving the data packet over a VXLAN. In one example, the VXLAN discovery apparatus 102 is in a router (e.g. router-1 104a) connected to a Layer 3 device, such as a VTEP (e.g. VTEP-1 108a), and receives the data packet from the connected device. The VXLAN stripper 202 strips encapsulation headers above the VXLAN packet encapsulating the L2 frame 116 so that the VXLAN header of the VXLAN packet is exposed. In some embodiments, the VXLAN stripper 202 strips encapsulation headers above the VXLAN packet in a single step, for example, using a TCAM or other device that can process enough bytes to strip the encapsulation headers above the VXLAN packet in one step. In other embodiments, the VXLAN stripper 202 strips the encapsulation headers above the VXLAN packet in multiple steps.

In some embodiments, the VXLAN discovery apparatus 102 includes a L2 frame type reader 204 configured to read a L2 frame type stored in the VXLAN header in response to stripping the encapsulation headers. The L2 frame type, in some embodiments, includes a data protocol, which is to be transmitted on to a destination VTEP (e.g. VTEP-2 108b). In other embodiments, the L2 frame type is a command protocol that includes a command to be executed. In some examples, the command is encoded in the L2 frame 116.

For example, the L2 frame type may be internet protocol ("IP") version 4 ("IPv4") or IP version 6 ("IPv6"). In addition, the L2 frame type includes, in some embodiments, further L2 frame type information, such as whether the L2 frame 116 is transmission control protocol ("TCP") or user datagram protocol ("UDP"). Where the L2 frame type is a command, the command may be a command to be executed, may be a request for more information, and the like. In various embodiments, the L2 frame type may be:

IPv4 TCP
IPv4 UDP
Address Resolution Protocol ("ARP")
Internet Control Message Protocol ("ICMP")
IPv6 TCP
IPv6 UDP
IPv6 ICMP
Bidirectional Forwarding Detection ("BFD")
Internet Group Management Protocol ("IGMP")
Protocol Independent Multicast ("PIM")

The above list is illustrative and non-exhaustive and provides some of the available L2 frame types that may be stored in the VXLAN header.

In some embodiments, the L2 frame type is encoded directly into the VXLAN header. In other embodiments, the L2 frame type is coded and a code representing the L2 frame type is stored in the VXLAN header. For example, IPv4 TCP may be 1A, IPv4 UDP may be 1B, IPv6 TCP may be 2A, IPv6 UDP may be 2B, ARP may be 3, etc. One of skill in the art will recognize other L2 frame types to be stored in a VXLAN header and will recognize other ways to store the L2 frame types in a VXLAN header.

In some embodiments, the VXLAN discovery apparatus 102 includes a VXLAN re-encapsulator 206 configured to re-encapsulate the VXLAN packet in a same format as the layers and associated encapsulation headers stripped from the received data packet in response to the L2 frame type indicating the L2 frame 116 includes data for transmission. For example, the L2 frame type reader 204 may determine that the L2 frame type is IPv4 TCP, which is an L2 frame type suitable for re-encapsulation and transmission.

The VXLAN re-encapsulator 206 re-encapsulates the VXLAN packet with the same header types and in the same format as the incoming data packet. Revisiting the example of the system 100 of FIG. 1, if the first router 104a receives the first data packet 118, which includes a L2 frame type of IPv2 TCP, the VXLAN re-encapsulator 206 creates the second data packet 120 and adds back the UDP header, the Outer IP header and the outer MAC header in the same format as the first data packet 118.

While the format, position, byte sizes, etc. of the UDP header, outer IP header and outer MAC header are the same as for the first data packet 118, the contents typically change. As seen in FIG. 1, the outer MAC header of the first data packet 118 and the second data packet 120 change so that the second data packet has an outer MAC header of MAC-2 for the source MAC address and MAC-3 for the destination MAC address to enable transmission of the second data packet 120 to the second router 104b. While MAC-in-UDP is described herein with VXLAN, other encapsulation methods are contemplated herein and the VXLAN stripper 202 strips other layers and headers above the VXLAN packet and the VXLAN re-encapsulator 206 re-encapsulates the VXLAN packet with appropriate layers and headers matching the current encapsulation scheme.

In one embodiment, the VXLAN stripper 202 saves data from the stripped headers and the VXLAN re-encapsulator 206 uses the stored header information to re-encapsulate the VXLAN packet. In other embodiments, the VXLAN re-encapsulator 206 encapsulates the VXLAN packet in a single step. In other embodiments, the VXLAN re-encapsulator 206 encapsulates the VXLAN packet in multiple steps. One of skill in the art will recognize other ways for the VXLAN re-encapsulator 206 to re-encapsulate the VXLAN packet.

Figure 3:
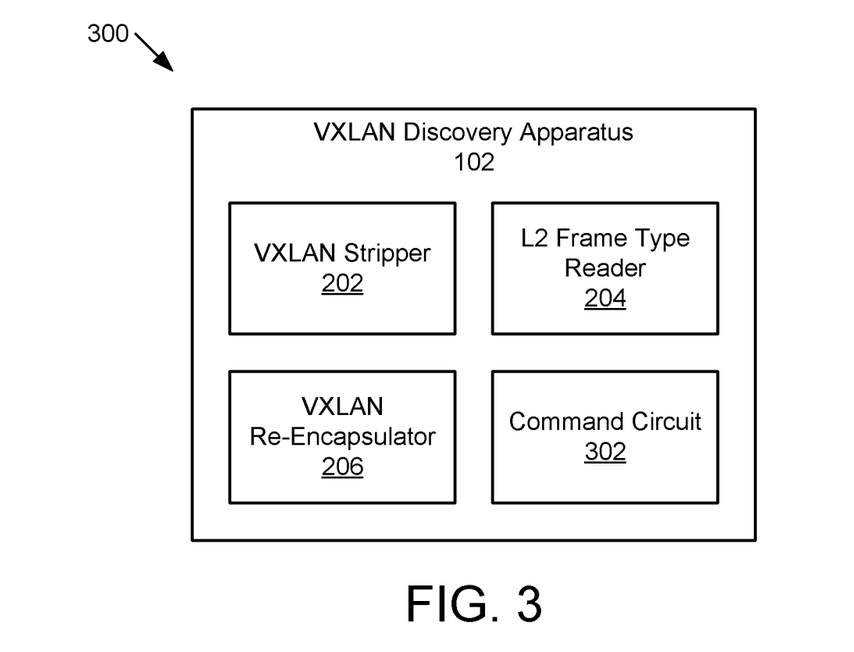
FIG. 3 is a schematic block diagram illustrating another embodiment of a VXLAN discovery apparatus.

FIG. 3 is a schematic block diagram illustrating another embodiment 300 of a VXLAN discovery apparatus 102. In the embodiment 300, the VXLAN discovery apparatus 102 includes a VXLAN stripper 202, a L2 frame type reader 204 and a VXLAN re-encapsulator 206, which are substantially similar to those described above with regard to the embodiment 200 of FIG. 2. The VXLAN discovery apparatus 102, in the embodiment 300, also includes a command circuit 302 configured to strip the VXLAN header from the VXLAN packet in response to the L2 frame type including a command protocol and executing a command encoded in the L2 frame 116. For example, where the L2 frame type reader 204 determines that the L2 frame type is ARP, the command circuit 302 strips the VXLAN header from the L2 frame 116 and executes the command encoded in the L2 frame 116.

In the example, when the L2 frame type is ARP, the L2 frame 116 is seeking discovery of a link layer address, such as a MAC address, associated with a given internet layer, typically an IPv4 address. The command circuit 302, in the embodiment, reads the hardware type, the protocol type, the hardware length, the protocol length, the operation (whether the operation that the sender is performing is 1) for request, or 2) for reply), the sender hardware address, sender protocol address, target hardware address, and target protocol address. The command circuit 302 takes appropriate actions based on the information in the L2 frame 116, which may be to determine a link layer address, to forward the L2 frame 116 to another appropriate device, etc. Where the L2 frame type is a command and the L2 frame 116 indicates that the data packet is to be forwarded, for example where a target address is different than an address where the command circuit 302 is executing, the VXLAN re-encapsulator 206 re-encapsulates the L2 frame 116 with the VXLAN header and other headers and transmits the data packet to an appropriate device. In one example, the destination device of the data packet depends on information in the L2 frame 116. One of skill in the art will recognize other ways to implement the command circuit 302.

Figure 4:
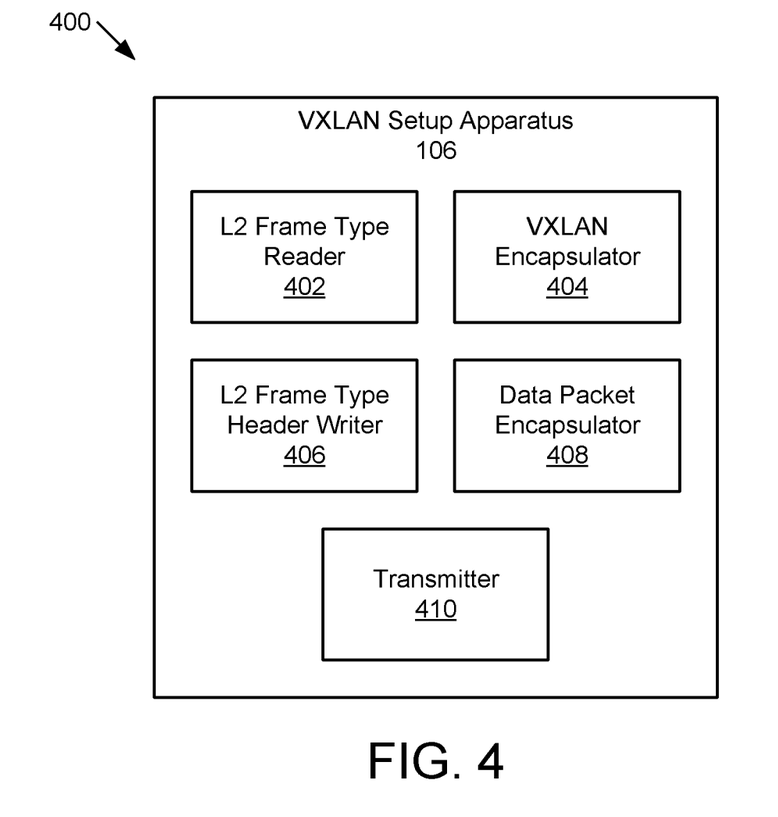
FIG. 4 is a schematic block diagram illustrating one embodiment of a VXLAN setup apparatus.

FIG. 4 is a schematic block diagram illustrating one embodiment 400 of a VXLAN setup apparatus 106. In the embodiment 400, the VXLAN setup apparatus 106 includes a L2 frame type reader 402, a VXLAN encapsulator 404, a L2 frame type header writer 406, a data packet encapsulator 408 and, in some embodiments, a transmitter 410, which are described below. In some embodiments, the VXLAN setup apparatus 106 is implemented with hardware circuits. In another embodiment, the VXLAN setup apparatus 106 is implemented with executable code stored on computer readable storage media. In other embodiments, the VXLAN setup apparatus 106 is implemented with a programmable hardware device, such as a field programmable gate array ("FPGA"). In other embodiments, the VXLAN setup apparatus 106 is implemented with some combination of hardware circuits, a programmable hardware device and/or executable code. In some examples, performance of the VXLAN setup apparatus 106 is lower than the VXLAN discovery apparatus 102, which may allow use of executable code that is executed by a processor. One of skill in the art will recognize other ways to implement the VXLAN setup apparatus 106.

The VXLAN setup apparatus 106 includes a L2 frame type reader 402 configured to determine a type of a L2 frame 116 prior to encapsulation of the L2 frame 116 in a VXLAN packet. For example, the L2 frame type reader 402 may determine that the L2 frame 116 is an IPv4 TCP frame. The L2 frame type reader 402 reads one or more appropriate fields of the L2 frame 116 to determine the L2 frame type.

The VXLAN setup apparatus 106 includes a VXLAN encapsulator 404 configured to encapsulate the L2 frame 116 into a VXLAN packet where the VXLAN packet includes a VXLAN header and the L2 frame 116. In some embodiments, the VXLAN encapsulator 404 creates a VXLAN header with a VXLAN identifier ("VNID") and VXLAN flag field and other fields, which may be reserved or used as described below. The VXLAN encapsulator 404 includes the L2 frame 116 as a payload of the VXLAN packet.

The VXLAN setup apparatus 106 includes a L2 frame type header writer 406 configured to write the L2 frame type, as determined by the L2 frame type reader 402, in the VXLAN header of the VXLAN packet. Currently, a VXLAN header includes a VNID, a VXLAN flag field and two reserved fields. In one embodiment, the L2 frame type header writer 406 writes the L2 frame type into a reserved field of the VXLAN header. In other embodiments, the VXLAN header format may change and the L2 frame type header writer 406 writes the L2 frame type in another field of the VXLAN header.

The VXLAN setup apparatus 106 includes a data packet encapsulator 408 configured to encapsulate the VXLAN packet with additional layers to form a data packet suitable for transmission. In some embodiments, the data packet encapsulator 408 uses MAC-to-UDP encapsulation and encapsulates the VXLAN packet in a UDP packet with a UDP header and the VXLAN packet as a payload of the UDP packet, encapsulates the UDP packet with an outer IP header and the UDP packet as a payload to form an outer IP packet, and encapsulates the outer IP packet with an outer MAC header and the outer IP packet as a payload to form the data packet. Returning to the example of the system 100 of FIG. 1, the data packet encapsulator 408 creates the first data packet 118 intended to be transmitted to the first router 104a.

In some embodiments, the VXLAN setup apparatus 106 includes a transmitter 410 configured to transmit the data packet in response to the data packet encapsulator 408 forming the data packet. In other embodiments, another device transmits the data packet. For example, a transmitter may be included in a VTEP (e.g. VTEP-1 108a) where the VXLAN setup apparatus 106 resides or another computing device that includes or is connected to the VTEP. One of skill in the art will recognize other locations of the transmitter 410 and ways to transmit the data packet.

Figure 5:
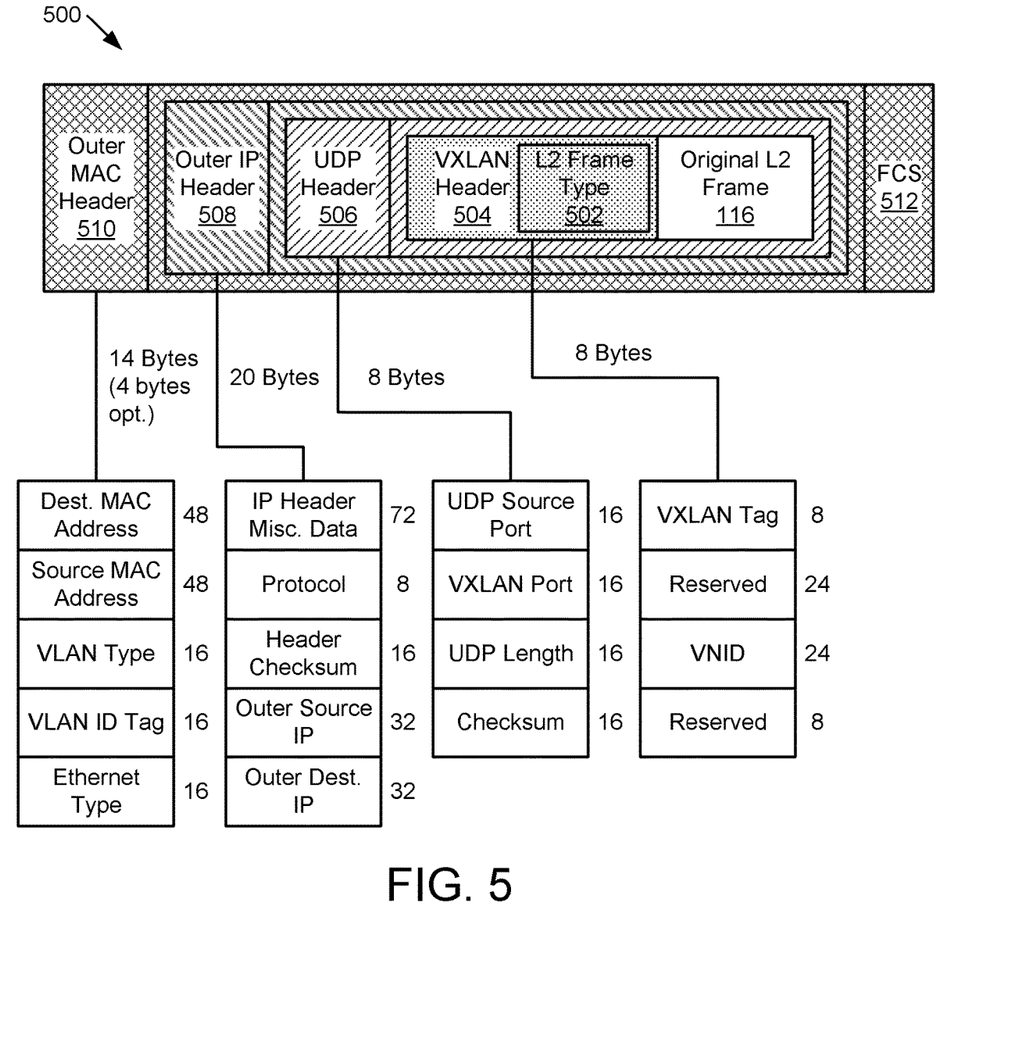
FIG. 5 is a schematic block diagram illustrating one embodiment of a data packet encapsulating a VXLAN packet with a VXLAN header and a L2 frame.

FIG. 5 is a schematic block diagram illustrating one embodiment of a data packet 500 encapsulating a VXLAN packet with a VXLAN header 504 and a L2 frame 116. The data packet 500 includes an original L2 frame 116 that a host (e.g. Host-A 110) wants to send to another location (e.g. Host-B 112). A VXLAN packet includes a VXLAN header 504 with a VXLAN frame type 502 and the L2 frame 116 as payload. In some embodiments, the VXLAN header 504 is 8 bytes and includes a VXLAN tag (or VXLAN flag field) of 8 bits, a reserved field of 24 bits, a VNID of 24 bits, and another reserved field of 8 bits.

A UDP packet includes a UDP header 506 and the VXLAN packet as a payload. The UDP header 506, in some embodiments, is 8 bytes and includes a UDP source port field of 16 bits, a VXLAN port field of 16 bits, a UDP length field of 16 bits and a checksum field of 16 bits. An outer IP packet includes an outer IP header 508 and the UDP packet as a payload. The outer IP header 508, in some embodiments, is 20 bytes and includes an IP header miscellaneous data field of 72 bits, a protocol field of 8 bits, a header checksum field of 16 bits, an outer source IP address field of 32 bits, and an outer destination IP address field of 16 bits. The data packet 500 includes an outer MAC header 510 and includes the outer IP packet as a payload. The outer MAC header 510 includes, in some embodiments, 14 bytes with 4 optional bytes and a destination MAC address field of 48 bits, a source MAC address field of 48 bits, a VLAN type field of 16 bits, a VLAN ID tag field of 16 bits and an Ethernet type field of 16 bits. In some embodiments, the data packet includes a frame check sequence 512, which is an error-detection code added to the data packet to determine if there were transmission errors.

Figure 6:
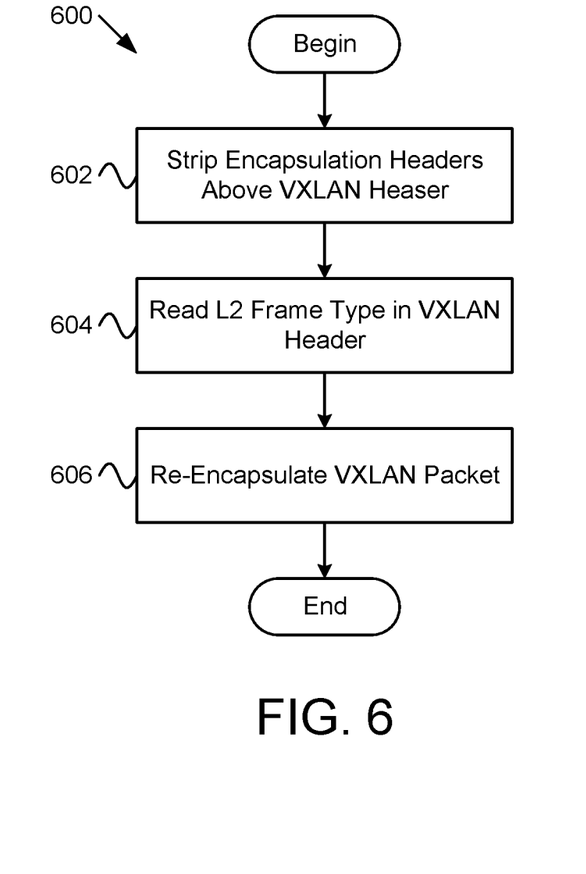
FIG. 6 is a schematic flow chart diagram illustrating one embodiment of a method for determining a L2 frame type without stripping a VXLAN header encapsulating the L2 frame.

FIG. 6 is a schematic flow chart diagram illustrating one embodiment of a method 600 for determining a L2 frame type without stripping a VXLAN header 504 encapsulating the L2 frame 116. The method 600 begins and strips 602 encapsulation headers 506, 508, 510 in layers above a VXLAN packet encapsulating a L2 frame 116 of a data packet 500 in response to receiving the data packet 500 over a VXLAN. For example, the data packet 500 may be similar to the first data packet 118 transmitted from the first VTEP 108a to the first router 104a and the method 600 strips 602 the UDP header 506, the outer IP header 508 and the outer MAC header 510 from the data packet 500 leaving the VXLAN packet with its VXLAN header 504 and L2 frame 116.

The method 600 reads 604 a L2 frame type stored in the VXLAN header 504 in response to stripping the encapsulation headers 506, 508, 510. For example, the method 600 reads the L2 frame type stored in a reserved field or other field of the VXLAN header 504. The method 600 re-encapsulates 606 the VXLAN packet in a same format as the layers and associated encapsulation headers 506, 508, 510 stripped from the received data packet 500 in response to the L2 frame type indicating the L2 frame 116 includes data for transmission, and the method 600 ends. In various embodiments, the VXLAN stripper 202, the L2 frame type reader 204 and/or the VXLAN re-encapsulator 206 perform one or more steps of the method 600.

Figure 7:
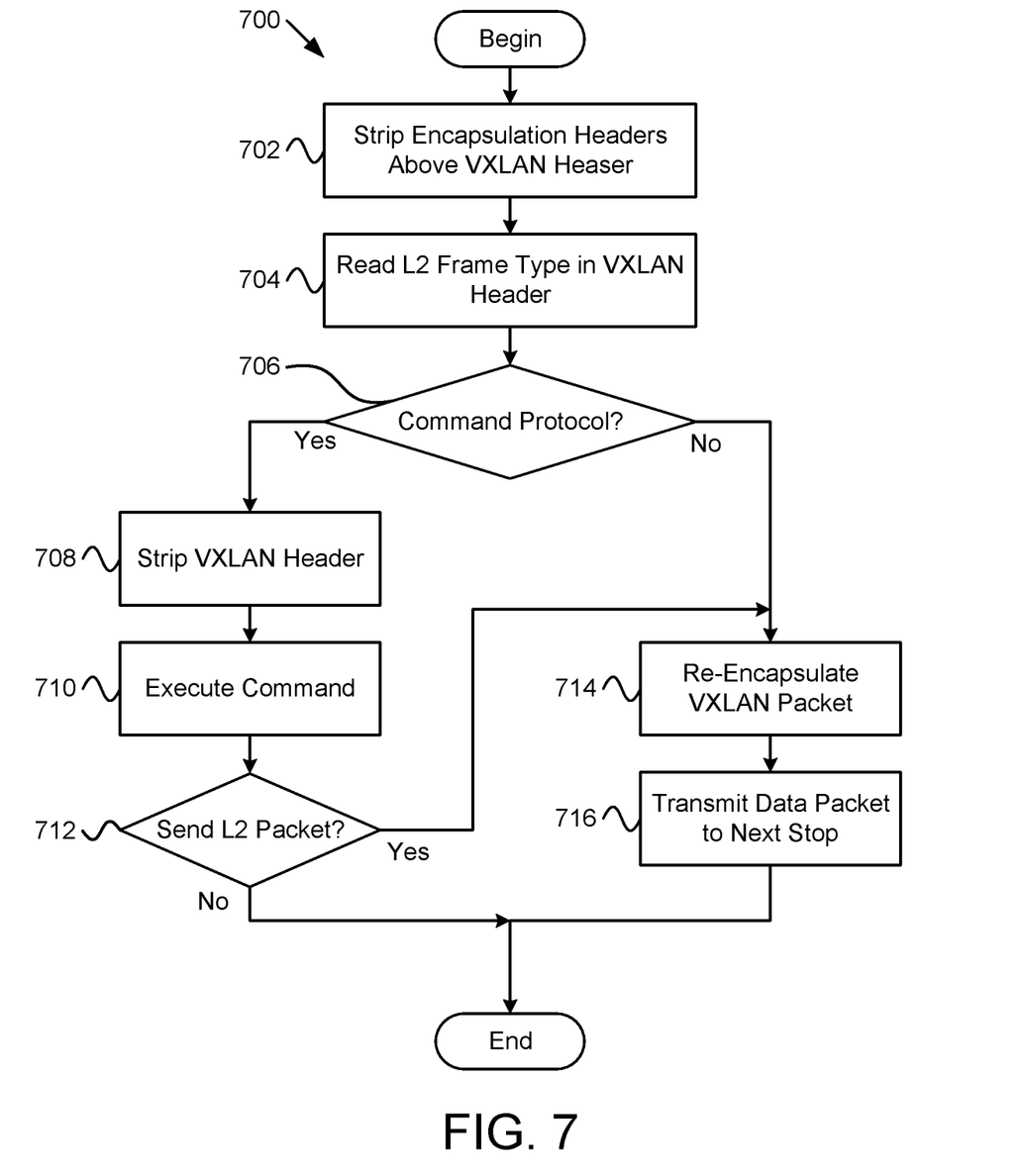
FIG. 7 is a schematic flow chart diagram illustrating another embodiment of a method for determining a L2 frame type without stripping a VXLAN header encapsulating the L2 frame.

FIG. 7 is a schematic flow chart diagram illustrating another embodiment of a method 700 for determining a L2 frame type without stripping a VXLAN header 504 encapsulating the L2 frame 116. The method 700 begins and strips 702 encapsulation headers 506, 508, 510 in layers above a VXLAN packet encapsulating a L2 frame 116 of a data packet 500 in response to receiving the data packet 500 over a VXLAN. The method 700 reads 704 a L2 frame type stored in the VXLAN header 504 in response to stripping the encapsulation headers 506, 508, 510 and determines 706 if the L2 frame type is a command protocol. If the method 700 determines 706 that the L2 frame type is a command protocol, the method 700 strips 708 the VXLAN header 504 from the VXLAN packet, leaving the L2 frame, and executes 710 a command coded in the L2 frame. The method 700 determines 712 if the data packet 500 should be sent after executing the command. If the method 700 determines 712 that the data packet 500 should not be sent, the method 700 ends.

If the method 700 determines 706 that the L2 frame type is not a command protocol (e.g. is a data protocol), the method 700 re-encapsulates 714 the VXLAN packet in a same format as the layers and associated encapsulation headers 506, 508, 510 stripped from the received data packet 500 and transmits 716 to a next stop, and the method 700 ends. If the method 700 determines 712 that the data packet 500 should be sent after executing 710 the command, the method 700 re-encapsulates 714 the VXLAN packet in a same format as the layers and associated encapsulation headers 506, 508, 510 stripped from the received data packet 500 and transmits 716 to a next stop, and the method 700 ends. In various embodiments, the VXLAN stripper 202, the L2 frame type reader 204, the VXLAN re-encapsulator 206 and/or the command circuit 302 perform one or more steps of the method 700.

Figure 8:
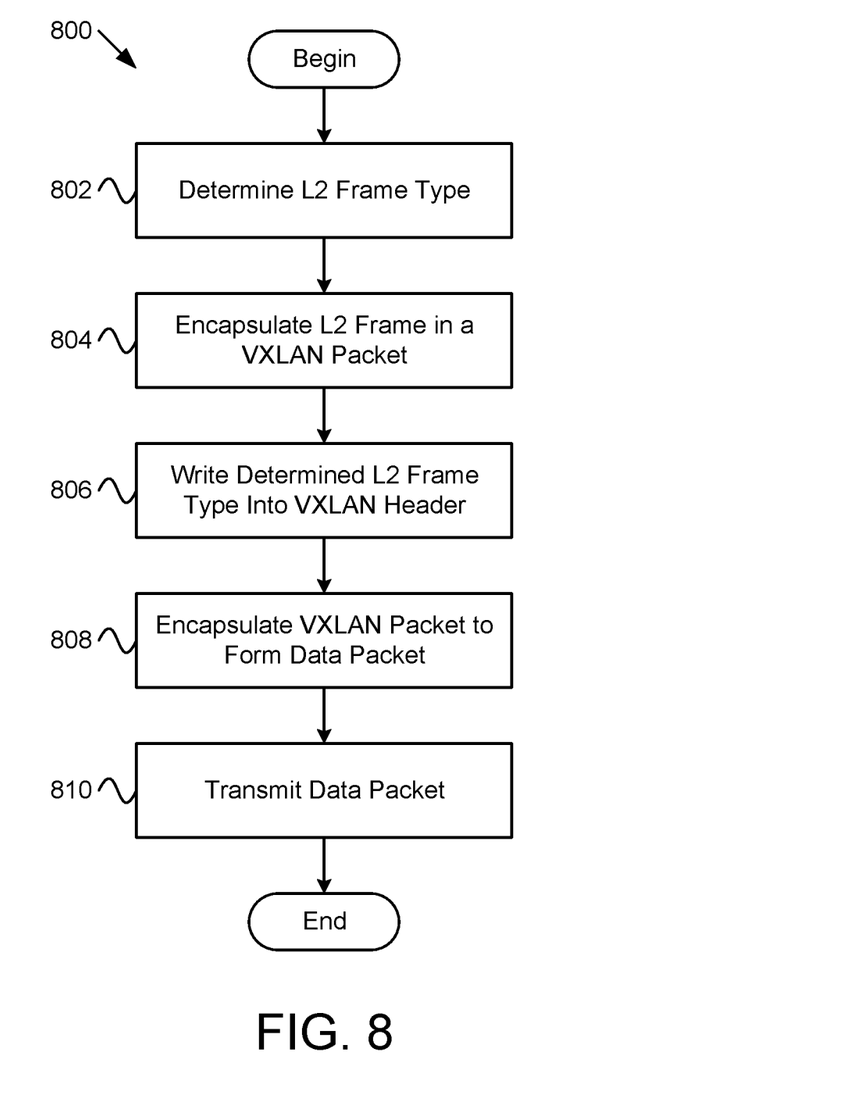
FIG. 8 is a schematic flow chart diagram illustrating one embodiment of a method for VXLAN encapsulation with a L2 frame type stored in a VXLAN header.

FIG. 8 is a schematic flow chart diagram illustrating one embodiment of a method 800 for VXLAN encapsulation with a L2 frame type stored in a VXLAN header 504. The method 800 begins and determines 802 a type of a L2 frame 116 prior to encapsulation of the L2 frame 116 in a VXLAN packet and encapsulates 804 the L2 frame 116 into a VXLAN packet where the VXLAN packet includes a VXLAN header 504 and the L2 frame 116. The method 800 writes 806 the determined L2 frame type in the VXLAN header 504 of the VXLAN packet and encapsulates 808 the VXLAN packet with additional layers to form a data packet 500 suitable for transmission. For example, the method 800 encapsulates 808 the VXLAN packet in a UDP packet with a UDP header 506, encapsulates 808 the UDP packet in an outer IP packet with an outer IP header 508, and encapsulates 808 the outer IP packet with an outer MAC header 510 to form the data packet 500. The method 800 transmits 810 the data packet 500 to a next destination, and the method 800 ends. In various embodiments, the L2 frame type reader 402, the VXLAN encapsulator 404, the L2 frame type header writer 406, the data packet encapsulator 408 and/or the transmitter 410 perform one or more of the steps of the method 800.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a virtual extensible local area network ("VXLAN") stripper, at an intermediate network device, configured to strip encapsulation headers in layers above a VXLAN packet encapsulating a Layer 2 ("L2") frame of a data packet in response to receiving the data packet over a VXLAN, the intermediate network device located on a data pathway between VXLAN tunneling endpoints;

a L2 frame type reader, at the intermediate network device, configured to read a L2 frame type stored in a VXLAN header in the VXLAN packet to determine if the L2 frame type is a data protocol or a command protocol, in response to the VXLAN stripper stripping the encapsulation headers; and a VXLAN re-encapsulator, at the intermediate network device, configured to re-encapsulate the VXLAN packet in a same format as the layers and associated encapsulation headers stripped from the received data packet in response to the L2 frame type, read by the L2 frame type reader, being a data protocol indicating the L2 frame comprises data for transmission.

2. The apparatus of claim 1, further comprising a command circuit configured to:
strip the VXLAN header from the VXLAN packet in response to the L2 frame type comprising a command protocol; and
execute a command encoded in the L2 frame.

3. The apparatus of claim 1, wherein the data packet is encapsulated using media access control address-in-user datagram protocol ("MAC-in-UDP") encapsulation.

4. The apparatus of claim 1, wherein the data packet comprises:
a VXLAN packet comprising the VXLAN header and encapsulating the L2 frame;
a user datagram protocol ("UDP") packet comprising a UDP header and encapsulating the VXLAN packet; and
an outer Internet Protocol ("IP") packet comprising an outer IP header and encapsulating the UPD packet,
wherein the data packet comprises an outer media access control ("MAC") header and the data packet encapsulates the outer IP packet.

5. The apparatus of claim 1, wherein the L2 frame type reader reads the L2 frame type while the VXLAN packet is intact.

6. The apparatus of claim 1, wherein the VXLAN header comprises the L2 frame type stored in the VXLAN header in addition to a VXLAN identifier ("VNID") and a VXLAN flag field.

7. The apparatus of claim 6, wherein the L2 frame type is stored in the VXLAN header at a VXLAN tunnel end point ("VTEP") that encapsulates the L2 frame into the data packet and transmits the data packet.

8. The apparatus of claim 7, wherein the VTEP comprises:
a L2 frame type reader configured to determine the type of the L2 frame prior to encapsulation of the L2 frame in the VXLAN packet; and
a VXLAN header writer configured to write the determined L2 frame type in the VXLAN header of the VXLAN packet.

9. A method comprising:
stripping, at an intermediate network device, encapsulation headers in layers above a virtual extensible local area network ("VXLAN") packet encapsulating a Layer 2 ("L2") frame of a data packet in response to receiving the data packet over a VXLAN, the intermediate network device located on a data pathway between VXLAN tunneling endpoints;
reading, at the intermediate network device, a L2 frame type stored in a VXLAN header in the VXLAN packet to determine if the L2 frame type is a data protocol or a command protocol, in response to stripping the encapsulation headers; and
re-encapsulating, at the intermediate network device, the VXLAN packet in a same format as the layers and associated encapsulation headers stripped from the received data packet in response to the L2 frame type being a data protocol indicating the L2 frame comprises data for transmission.

10. The method of claim 9, further comprising:
stripping the VXLAN header from the VXLAN packet in response to the L2 frame type comprising a command protocol; and
executing a command encoded in the L2 frame.

11. The method of claim 9, wherein reading a L2 frame type comprises reading the L2 frame type while the VXLAN packet is intact.

12. The method of claim 9, wherein the data packet comprises:
a VXLAN packet comprising the VXLAN header and encapsulating the L2 frame;
a UDP packet comprising a UDP header and encapsulating the VXLAN packet; and
an outer Internet Protocol ("IP") packet comprising an outer IP header and encapsulating the UPD packet,
wherein the data packet comprises an outer MAC header and the data packet encapsulates the outer IP packet.

13. The method of claim 9, wherein the VXLAN header comprises the L2 frame type stored in the VXLAN header in addition to a VXLAN identifier ("VNID") and a VXLAN flag field.

14. The method of claim 13, wherein the L2 frame type is stored in the VXLAN header at a VXLAN tunnel end point ("VTEP") that encapsulates the L2 frame into the data packet and transmits the data packet.

15. The method of claim 9, wherein the data packet is encapsulated using media access control address-in-user datagram protocol ("MAC-in-UDP") encapsulation.

16. An apparatus comprising:
a Layer 2 ("L2") frame type reader configured to determine a type of a L2 frame prior to encapsulation of the L2 frame in a virtual extensible local area network ("VXLAN") packet;
a VXLAN encapsulator configured to encapsulate the L2 frame into a VXLAN packet, the VXLAN packet comprising a VXLAN header and the L2 frame;
a L2 frame type header writer configured to write the determined L2 frame type in the VXLAN header of the VXLAN packet, the L2 frame type comprising one of a data protocol and a command protocol, the data protocol indicating that the L2 frame comprises data for transmission and the command protocol indicating that the L2 frame comprises a command for execution;
a data packet encapsulator configured to encapsulate the VXLAN packet with additional layers to form a data packet suitable for transmission; and
a transmitter configured to transmit the data packet in response to the data packet encapsulator forming the data packet.

17. The apparatus of claim 16, further comprising:
a VXLAN stripper, at an intermediate network device, configured to strip encapsulation headers in the layers above the VXLAN packet in response to receiving the data packet over a VXLAN, the intermediate network device located on a data pathway between a VXLAN tunneling endpoint transmitting the data packet and a VXLAN tunneling endpoint receiving the data packet;
a L2 frame type reader, at the intermediate network device, configured to read a L2 frame type stored in the VXLAN header in response to stripping the encapsulation headers;
a command circuit, at the intermediate network device, configured to:

strip the VXLAN header from the VXLAN packet in response to the L2 frame type comprising a command protocol; and execute a command encoded in the L2 frame; and a VXLAN re-encapsulator, at the intermediate network device, configured to re-encapsulate the VXLAN packet in a same format as the layers and associated encapsulation headers stripped from the received data packet in response to the L2 frame type indicating the L2 frame comprises data for transmission.

18. The apparatus of claim 16, wherein the data packet is encapsulated using media access control address-in-user datagram protocol ("MAC-in-UDP") encapsulation and wherein the VXLAN header comprises the L2 frame type stored in the VXLAN header in addition to a VXLAN identifier ("VNID") and a VXLAN flag field.

* * * * *